United States Patent
DeMassa

(10) Patent No.: US 6,676,849 B2
(45) Date of Patent: Jan. 13, 2004

(54) LOW YELLOWING SCORCH INHIBITOR COMPOSITION

(75) Inventor: John Matthew DeMassa, Norwalk, CT (US)

(73) Assignee: R. T. Vanderbilt Company, Inc., Norwalk, CT (US)

( * ) Notice: Subject to any disclaimer, the term of this patent is extended or adjusted under 35 U.S.C. 154(b) by 0 days.

(21) Appl. No.: 10/386,415

(22) Filed: Mar. 11, 2003

(65) Prior Publication Data

US 2003/0199598 A1 Oct. 23, 2003

Related U.S. Application Data

(60) Provisional application No. 60/363,954, filed on Mar. 13, 2002.

(51) Int. Cl.[7] .................. C09K 15/08; C09K 15/14; C09K 15/24; C08G 18/10; C08J 9/00
(52) U.S. Cl. .................. 252/182.31; 252/182.29; 252/182.24; 252/404; 521/115; 521/117; 521/128; 521/129; 521/107
(58) Field of Search .................. 521/115, 117, 521/128, 129, 906, 107; 252/182.2, 182.24, 182.26, 182.7, 182.29, 182.31, 404, 393, 394

(56) References Cited

U.S. PATENT DOCUMENTS

| | | | |
|---|---|---|---|
| 3,920,587 A | 11/1975 | Watkinson et al. | 260/2.5 AH |
| 4,058,493 A | 11/1977 | Prokai et al. | 260/2.5 |
| 4,933,374 A | 6/1990 | Suhoza et al. | 521/117 |
| 5,143,943 A | 9/1992 | Suhoza et al. | 521/115 |
| 5,219,892 A | 6/1993 | Suhoza | 521/107 |

OTHER PUBLICATIONS

Smeltz, Kenneth C., "Why Do White Fabrics and Garments Turn Yellow During Storage in Polyethylene Bags and Wrappings?", Textile Chemist and Colorist, Apr. 1983, vol. 15, No. 4, p. 17.

Muller, H., "Metal Deactivators" in Plastics Additives Handbook, 2nd Ed. Edited by R. Gachter and H. Muller, Hanser Publishers, 1987, p. 118.

*Primary Examiner*—Joseph D. Anthony
(74) *Attorney, Agent, or Firm*—Norris McLaughlin & Marcus

(57) ABSTRACT

A scorch inhibitor composition for use an additive in the manufacture of polyurethane foams is based on a derivatized phenol, 4-tertbutyl catechol, and optionally, phenothiazine. The derivatized phenol is a di-tert-butyl phenol, preferably a 2,6 tert-butyl phenol substituted at least at the 4-position with an aliphatic, aromatic or aliphatic-aromatic moiety, of $C_2$ or greater. Preferably, the phenol is a liquid, and is chosen from among 2,6 di-tert-butyl-4-isobutyl phenol; 2,6 di-tert-butyl-4-nonyl phenol; and benzenepropanoic acid, 3,5-bis (1,1-dimethyl-ethyl)-4-hydroxy-.C7–C9 branched alkyl esters. The phenol may optionally possess combinations of heteroatoms, such as O, N, P or S, and may be dimerized.

16 Claims, No Drawings

LOW YELLOWING SCORCH INHIBITOR COMPOSITION

BACKGROUND OF DESCRIPTION OF THE PRIOR ART

The product of the invention relates to scorch inhibitors added to the polyol during or after its manufacture. Also the scorch inhibitor may be added during the production of polyurethane foams. It is a known problem in the art that existing scorch inhibitors based on conventional amine/phenolic blends cause foam to yellow following exposure to light or NOx fumes. In general, yellowing has been attributed to a variety of sources. For example, reaction products from additives like BHT lead to color bodies such as quinones (K. C. Smeltz, Textile Chemist an Colorist, April 1983, Vol. 15, NO 4), and the polyurethane itself forms color bodies such as diquinone imide as a result of photooxidation (Muller, Plastic Additives, 2nd edition, pg 119). Yellowing also comes from amine substances that presumably oxidize and form color bodies (Muller). It is believed that yellowing may be attributed to amine discoloration.

U.S. Pat. No. 4,058,493 to Pokai et al teaches a foam composition, in which an inhibitor is added. Such additive may be a phenol substituted with tertiary-butyl groups, such as 2,6-di-tert-butyl-4-methylphenol (Ionol®[BHT]); (or) tert-butyl-catechol; (or) phenothiazine; among others. While such additives may act to inhibit scorch, they may also contribute to foam yellowing when exposed to NOx fumes, ultraviolet radiation or fluorescent light. Importantly, when Ionol (BHT) is used, alone or in blends, excessive yellowing is observed under these conditions, which is undesirable in many consumer applications (e.g. mattress foam).

Therefore, it is the object of the invention to provide an additive to polyurethane foams which inhibits scorch, but which also only minimally contributes to discoloration arising from NOx, ultraviolet radiation and fluorescent light exposure.

SUMMARY

The inventors have surprisingly found that an additive based on a combination of a derivatized phenolic, 4-tertbutyl catechol (TBC) and, optionally, phenothiazine (PTZ), is effective against discoloration based on the above factors.

A wide of range of phenolics have been found to be effective, in place of BHT, in combination with the above components. Essentially, it has been found that by substituting at the 4 position of a di-tert-butyl phenolic with a moiety other than methyl (as in BHT), an improved result is obtained. In particular, a 2,6-tert-butyl phenol, substituted at the 4 position with an aromatic, aliphatic or aromatic-aliphatic moiety of $C_2$ or greater, optionally possessing combinations of heteroatoms, preferably N, O, S or P. Optionally, those phenolics possessing combinations of heteroatoms may be dimerized. It is also expected that a 2,4-tert-butyl phenol substituted at the 4 position would also show beneficial effects.

Among these are solid phenolics, such as Anox® 70 (2,2'-thiodiethylene bis[3-(3,5-di-t-butyl-4-hydroxyphenyl)propionate]) (formula I), Lowinox® TBM6 (4,4'-thio-bis-(2-t-butyl-5-methyl-phenol) and Lowinox® MD24 (1,2-bis (3,5-di-tert-butyl-4-hydroxyhydrocinnamoyl) hydrazine) (formula III); all from Great Lakes Chemical Corporation. It is also found that Lowinox® AH25 (2,5-di-t-amyl-hydroquinone) (formula II) offers improved results.

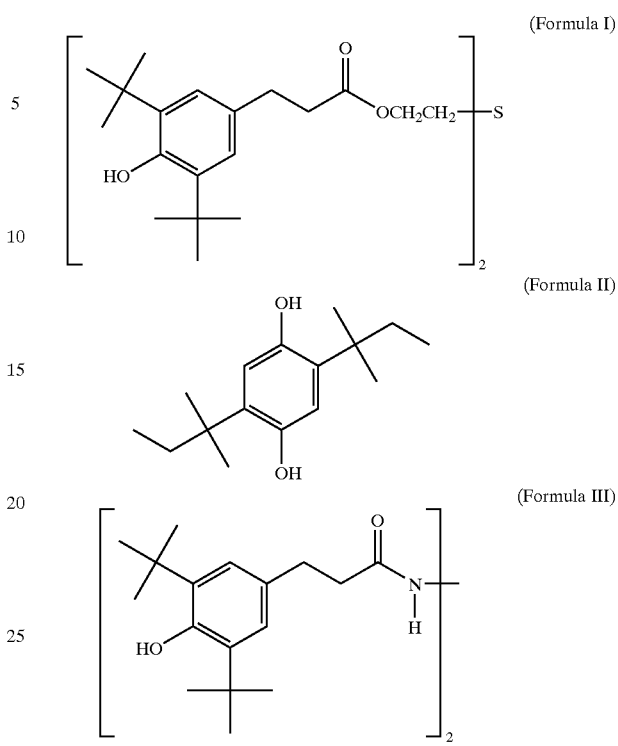

More preferred are liquid phenolics, such as Isonox® 132, Isonox® 232, both available from Schenectady Chemicals, Inc. and Irganox® 1135 (Benzenepropanoic acid, 3,5-bis (1,1-dimethyl-ethyl)-4-hydroxy-.C7–C9 branched alkyl esters—CAS Number: 125643-61-0) available from Ciba Specialty Chemicals.

Irganox® 1135 is benzenepropanoic acid, 3,5-bis (1,1-dimethyl-ethyl)-4-hydroxy-.C7–C9 branched alkly esters (Formula IV):

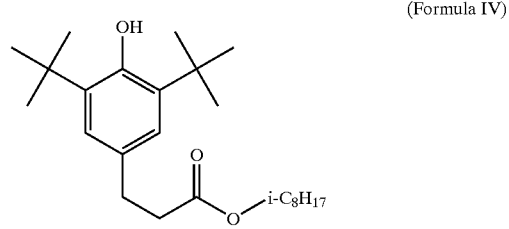

Particularly preferred is Isonox® 232 (2,6 di-tert-butyl-4-nonyl phenol) (Formula V)

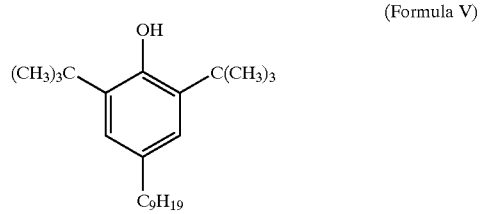

Most preferred is Isonox® 132 (2,6 di-tert-butyl-4-isobutyl phenol) (Formula VI)

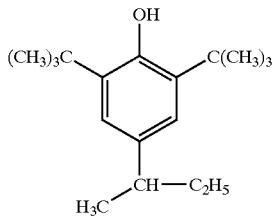

(Formula VI)

Thus, the invention resides in a composition to be added to a polyol, during or after the manufacture thereof. Also, the composition may be added during the manufacture of polyurethane foams. Such polyols and foams are manufactured according to well-known methods, such as those set forth in U.S. Pat. No. 5,219,892 to Suhoza.

The basic formulation of the foam used during the testing phase is as follows. Other known foam formulations can be used as well:

TABLE I

|  | parts |
| --- | --- |
| Polyol | 100.00 |
| Distilled Water | 5.50 |
| L5770 Silicone (OSi) | 1.20 |
| A127 Amine Catalyst (OSi) | 0.47 |
| Fyrol FR2 (Akzo/Nobel) | 7.00 |
| Dabco T9 (Air Products) | 0.25 |
| Mondur TD80 Grade A TDI (Bayer AG) | 70.80 |
| Additive | 0.50 |

The scorch inhibitor ("Additive" in Table I) is a three-component system comprising:

(1) A derivatized phenol, from about 45–95 weight %, preferably 65–75 weight %, more preferably about 66.5%

(2) 4-tert-butyl catechol, from about 5–55 weight %, preferably 22–35 weight %, more preferably about 33%, and (3) PTZ from 0 to 2 weight %, preferably 0 to 0.75%, more preferably about 0.5% Note: All weights % are weight % based on the total weight of the three-component system.

The scorch inhibitor may be present in the foam formulation based on a range of about 0.25 to 0.75 parts per 100 parts polyol, preferably about 0.30 to 0.60, and more preferably about 0.35 to 0.50.

A comparative experiment was conducted comparing a composition based on Isonox 132 (from Schenectady International, Inc.) against BHT, on an equal weight basis in a tert-butyl catechol/PTZ blend. The tert-butyl catechol/PTZ amount remained the same in both the inventive (1) and comparison (2) compositions. Both compositions 1 and 2 were added to the foam formulation in the amount of the 'additive' of Table I. As shown below, it was discovered that replacing the methyl at the 4 position on the phenol component (in this case with a tert-butyl group) strongly inhibits color development in foam.

The Inventive Composition 1 (PLX 976)

Isonox 132 (2,6 ditert butyl 4 isobutyl phenol) 66.5%,
4-tertbutyl Catechol (33%)
and PTZ (app 0.5%)
We compared this composition to The Comparative Composition 2

2,6-di-tert-butyl-4-methylphenol (BHT) (66.5%),
4-Tert butyl Catechol (33%)
and PTZ (app 0.5%).

In short, we substituted Isonox 132 for BHT. One would expect the performance to be about the same with respect to scorch reduction, and indeed we did not see a noticeable difference on this parameter. However, scorch reduction is not the only concern in polyurethane foam production. Certain industries and uses require that the foam also resist yellowing, which is a common effect. Such yellowing over time may be caused by several different factors, among them exposure to $NO_x$ gases, exposure to ultraviolet radiation, and exposure to fluorescent light. The foams produced based on additive Composition 1 and Comparative Composition 2 were subjected to $NO_x$ gases in a gas fade chamber, U.V. irradiation in a U.V. Weather-ometer, and to fluorescent light.

We exposed the foams in a gas fade chamber, which generates NO, fumes. We then measured, using a colorimeter, the development of color over time. A large value on this scale (b scale) indicates more intense yellowing.

TABLE IIA

Gas Fade Chamber Results (b Scale Colorimeter)

| Time (in hours) | Composition 1 | Comparative Composition 2 | Δ b |
| --- | --- | --- | --- |
| 3 | 5.42 | 4.12 | −1.3 |
| 6 | 9.05 | 9.66 | 0.61 |
| 9.5 | 12.28 | 14.63 | 2.35 |
| 12 | 12.84 | 15.74 | 2.90 |

The results show that the foam containing comparative Composition 2 develops a more intense yellow color, as indicated by the larger b value, than inventive composition A after extended exposure in the gas fade chamber. The difference between the two values (Δb) also steadily increases showing greater rate in color body production in composition 2 vs. composition 1.

The colorimeter can also measure the extent of green developed in the sample. A positive number on this scale (a scale) indicates 'redness' while a negative number indicates 'greenness.'

TABLE IIB

Gas Fade Chamber Results ('a' Scale Colorimeter)

| Time (in hours) | Composition 1 | Comparative Composition 2 |
| --- | --- | --- |
| 3 | −0.12 | −0.09 |
| 6 | −1.13 | −4.63 |
| 9.5 | −1.18 | −2.43 |
| 12 | −0.92 | −2.09 |

The result show that the foam containing Comparative Composition 2 develops a more intense green color than Composition 1 (about double) after extended exposure in the Gas fade chamber.

Green and yellow when blended form a very intense yellow. This is quite important to customers in the industry (e.g. manufacture of foam for mattresses). In short, we found that Comparative Composition 2 develops a more intense yellow hue over time compared to Composition 1.

Thus, by exchanging BHT (which contains a primary carbon or methyl group at the 4 postition on the 2,6 ditertbutyl phenol) with Isonox 132 (which contains a tertiary carbon at the 4 position) we have significantly reduced yellow color development in foam when subjected to $NO_x$ gasses generated in the Gas fade chamber.

We also examined the performance of each composition under fluorescent light. B scale value, indicatin 'yellowness', are shown below:

TABLE IIIA

Fluorescent Light Results ('b' Scale Colorimeter)

| Time (in days) | Composition 1 | Comparative Composition 2 |
|---|---|---|
| 12 | 7.14 | 9.46 |

'a' scale values are shown below (negative values show greenish hues while positive values show reddish hues);

TABLE IIIB

Fluorescent Light Results ('a' scale Colorimeter)

| Time (in days) | Composition 1 | Comparative Composition 2 |
|---|---|---|
| 12 | 0.06 | −0.17 |

Taking the values together we found that composition 2 darkened the foam towards a deep yellow after 12 day exposure. Inventive composition 2 comparatively darkened less. It is important to note that the approximately 2.5 unit difference between the yellowness values is quite significant visually. One can clearly see less color deflection with the foam using the inventive composition.

The same trends were observed when foam samples were exposed to U.V. light (carbon arc source) over time.

TABLE IV

U.V. Weather-ometer Results (b Scale Colorimeter)

| Time (in hours) | Composition 1 | Comparative Composition 2 | Δ b |
|---|---|---|---|
| 1 | 1.81 | 1.70 | −0.11 |
| 2 | 3.63 | 3.85 | 0.22 |
| 3 | 5.57 | 5.94 | 0.37 |
| 4 | 6.29 | 7.03 | 0.74 |
| 5 | 6.85 | 8.59 | 1.74 |
| 6 | 8.52 | 9.81 | 1.29 |
| 7 | 9.24 | 10.98 | 1.74 |
| 8 | 10.36 | 12.38 | 2.02 |
| 9 | 10.77 | 13.02 | 2.25 |
| 10 | 11.36 | 13.67 | 2.31 |

The delta b values show that composition 2 is developing color bodies more rapidly than the inventive composition.

SCORCH STUDY TBC ALONE

As background, TBC was tested against a conventional or state of the art blend consisting of 4000 ppm BHT (a phenolic derivative) and 1000 ppm Naugard 445 (an alkylated diphenyl amine) in a foam formulation. The extent of scorch was approximately equal for each of the test foams with a slight color difference in the scorched area of the foam core.

Foam swatches exposed to NOx fumes, however, showed a considerable difference after many hours of exposure (Table V).

The TBC stabilized foam discolored less (developed less yellow color) after 9 hours exposure to NOx fumes compared to the conventional (BHT/alkylated diphenyl amine) blend.

TABLE V

| | Scorch | 6 Hrs $NO_x$ Fume | 9 Hrs $NO_x$ Fume |
|---|---|---|---|
| TBC alone | Light Yellow | 8.00 | 11.2 |
| Conventional BHT/Amine | Golden | 10.00 | 16 |

TABLE VI

COMPARING ISONOX ® 232 AND ISONOX ® 132

| | Conventional BHT | Conventional 945 | PLX 976/232 | PLX 976/132 |
|---|---|---|---|---|
| 6 Hrs Fume | 5.67 | 8.80 | 6.31 | 6.26 |
| 9 Hrs Fume | 11.97 | 14.67 | 9.19 | 8.90 |

These liquid phenolic compounds were blended with tert butyl catechol for the purpose of making a liquid scorch inhibitor package. 'Conventional 945' refers to Vanox® 945 from R. T. Vanderbilt Company, Inc. Currently, liquid scorch inhibitors are highly desirable in the industry. We found that Isonox 232 and Isonox 132 (Schenectady Chemicals Inc., N.Y.) worked equally well as TBC diluents (PLX 976/232 and PLX 976/132) (Table VI). We also discovered that each of the two packages stained foam much less than both commercially available (phenolic/amine) blends, conventional BHT and conventional 945.

Another liquid phenolic was examined in combination with tert-butyl catechol and PTZ. Irganox 1135 (available from Ciba-Giegy) adequately dissolved TBC and phenothiazine to make a liquid scorch inhibitor. Again, we observed similar scorch protection with this package against the conventional 945 product (amine/phenolic blend) and the preferred inventive package PLX 976.

TABLE VIa

FLUORESCENT LIGHT EXPOSURE

| | Conventional 945 | PLX 976 | 1135 Replacing ISONOX 132 in PLX 976 |
|---|---|---|---|
| Unexposed b | −1.68 | −1.47 | −1.47 |
| 6 Days b | 11.53 | 6.04 | 6.17 |
| 13 Days b | 13.90 | 10.08 | 10.49 |

When exposed to fluorescent light the "1135" modified product performed similarly to PLX 976 but both developed less color (less yellowness) than the conventional product after 13 days (Table VI a). On this basis, Irganox 1135 is an acceptable alternative to Isonox 132 as an active diluent.

TABLE VIb

WEATHEROMETER

|  | Conventional 945 | PLX 976 | 1135 Replacing ISONOX 132 in PLX 976 |
|---|---|---|---|
| Unexposed |  |  |  |
| B 3 Hours | −1.50 | −1.30 | 1.58 |
| B 6 Hours | 11.09 | 6.19 | 5.53 |
| B 9 Hours | 13.30 | 8.75 | 8.21 |
| B | 14.82 | 11.29 | 11.42 |

When exposed to ultraviolet the foam containing Irganox 1135 performed similarly to PLX 976 but, as with fluorescent light exposure, both developed less color (less yellowness) than the conventional product after extended exposure (Table VI b). Again, on this basis, Irganox 1135 is an acceptable alternative to Isonox 132 as an active diluent for the composition.

TABLE VIc

ATMOSPHERIC FUME CHAMBER

|  | VANOX 945 | PLX 976 | 1135 Replacing ISONOX 132 in PLX 976 |
|---|---|---|---|
| 0 Hours |  |  |  |
| (b) 4 Hours | −1.78 | −1.61 | −1.69 |
| (b) 8 Hours | 7.56 | 5.73 | 6.97 |
| (b) | 13.43 | 8.53 | 12.36 |

When exposed to $NO_x$ the foam containing Irganox 1135 performed poorly developed more color (more yellowness) than PLX 976, almost identical with the conventional package (Table VIc). Though the 1135 modified package showed equal performance with PLX 976, in two of the three evaluations, 1135 stains foam more intensely, than Isonox 132.

TABLE VII

TBC/132 VS TBC/132/PTZ

|  | NOx Fume | | Fluorescent light | | U.V. light | |
|---|---|---|---|---|---|---|
|  | 3 Hrs | 6 Hrs | 10 Days | 22 Days | 1 Hr | 2.5 Hrs |
| PTZ | 7.64 | 9.67 | 7.15 | 11.51 | 2.46 | 4.9 |
| No PTZ | 7.67 | 9.87 | 7.09 | 11.27 | 2.43 | 5.06 |
| Conventional BHT | 9.52 | 13.72 | 11.92 | 15.96 | 5.45 | 9.76 |
| Conventional 945 | 12.16 | 14.95 | 12.38 | 14.66 | 6.02 | 9.22 |

The TBC/Isonox® 132 scorch inhibitor package reduced scorch as well as the conventional BHT/alkylated diphenyl amine blend and conventional 945 but improvement in scorch performance was discovered by the addition of phenothiazine. Each trial foam was then exposed to NOx fumes, fluorescent light and U.V. light (Table VII). Studies indicate that the addition of phenothiazine did not adversely affect color stability (i.e. b values were approximately the same for TBC/Isonox 132 blend and TBC/Isonox 132/PTZ blend). Stated another way each foam (+PTZ and no PTZ) sample developed an equal yellow hue visually and quantitatively but addition of PTZ improved scorch performance.

TABLE VIII

EXAMINATION OF PLX-976 FORMULA

|  | NOx Fume | | | Florescent Light | | | U.V. Light | | |
|---|---|---|---|---|---|---|---|---|---|
|  | 6 Hrs | 18 Hrs | 24 Hrs | 6 Days | 20 Days | 35 Days | 1 Hr | 5 Hrs | 11 Hrs |
| PLX-976 | 4.39 | 10.76 | 12.5 | 4.73 | 10.18 | 13.04 | 1.7 | 7.12 | 12.9 |
| BHT/976 | 3.36 | 11.24 | 13.4 | 4.64 | 13.44 | 15.28 | 1.42 | 7.02 | 13.54 |
| 232/976 | 7.4 | 14.29 | 15.8 | 4.87 | 10.69 | 13.39 | 1.78 | 7.48 | 13.2 |
| 1010/976 | 5.13 | 13.78 | 15.66 | 4.6 | 10.80 | 14.14 | 1.56 | 7.89 | 13.95 |

We examined other phenolic compounds in combination with tert butyl catechol and phenothiazine (TBC/BHT/PTZ, TBC/J-232/PTZ, TBC/Irganox 1010/PTZ). Each performed equally, in our scorch test, to the preferred experimental blend PLX 976 (TBC/I-1 32/Phenothiazine) but swatches exposed to the NOx Fumes, Fluorescent light and U.V. light showed noticeable differences (Table IV). Each test showed that after extended exposure to stressful environments PLX 976 performed better. It is important to emphasize that the BHT and 1010 blends are solid compositions, which although functional, are less preferred.

TABLE IX

UNSTABILIZED VS PLX-976

|  | Fume Chamber | | Fluorescent Light | W-O-M | |
|---|---|---|---|---|---|
|  | 7.0 Hrs | 11.5 Hrs. | 3 Days | ½ Hr | 1½ Hr |
| Unstabilized | 5.44 | 8.01 | 5.63 | 0.93 | 5.34 |
| PLX-976 | 6.58 | 9.54 | 4.87 | 1.70 | 5.71 |
| Conv. Blend | 4.93 | 10.53 | 7.84 | 1.83 | 7.12 |
| VANOX 945 | 10.21 | 14.60 | 10.40 | 5.68 | 10.49 |

While the preferred blend was shown to stain foam less in the tests so far discussed we wanted to compare color development of this test composition and the two conventional blends against an unstabilized foam composition (typical foam recipe without a scorch inhibitor package). Our objective was to understand how much additional color is contributed from our novel package and the conventional offerings. We discovered that PLX 976 and the conventional blends (BHT and 945) impart color to foam or stain the foam under all test conditions while the unstabilized foam composition, developed less color, except for fluorescent light exposure, than all of the foam compositions containing an inhibitor package (Table V). However, PLX 976 added the least amount of color to the foam among the scorch inhibitor packages studied. Importantly, the unstabilized foam composition showed severe scorching in our box foam microwave test. Thus, any of the scorch inhibitors are preferred to no inhibitor package but among those studied PLX 976 is most preferred because it contributes the least amount of color.

TABLE X

PARTIAL STEP STUDY

|  | AFC | | Fluorescent Light | | W-O-M | |
| --- | --- | --- | --- | --- | --- | --- |
|  | 2 Hr | 4 Hr | 1 Day | 9 Days | 2 Hr | 4 Hr |
| PLX-976 (5000 ppm) | 3.38 | 6.83 | 1.66 | 11.6 | 1.16 | 2.89 |
| PLX-976 (3500 ppm) | 3.05 | 6.49 | 1.18 | 11.0 | 0.86 | 2.59 |

The use level of PLX 976 can be adjusted depending upon desired foam production rates and polyol manufacturers preferences. Examination of two different use levels showed that lower concentrations of PLX 976 imparted less staining to foam swatches exposed to NOx fumes, fluorescent light or U.V. light.

TABLE XI

FLUORESCENT LIGHT EXPOSURE

|  | C2 Conventional 945 | C3 PLX 976 | C31 ANOX 70 in 976 | C32 Lowinox AH25 in 976 | C33 Lowinox TBM6 in 976 | C34 Lowinox MD24 in 976 |
| --- | --- | --- | --- | --- | --- | --- |
| Unexposed |  |  |  |  |  |  |
| b 2 Days | −1.69 | −1.56 | −1.49 | −1.28 | −1.01 | −1.31 |
| b 7 Days | 8.63 | 2.65 | 3.19 | 4.10 | 4.37 | 4.41 |
| b | 12.82 | 7.89 | 8.28 | 9.90 | 9.42 | 10.70 |

We examined other commercially available Phenolic derivatives and found similar scorch performance with these packages vs. PLX 976. None of the blends shown (Table VII) were liquid of course with the exception of PLX 976. In all cases after 7 days fluorescent light exposure, the proposed blends developed less color than the conventional package. However, PLX 976 developed less color than the proposed blends throughout the exposure period.

TABLE XII

WEATHEROMETER

|  | C2 Conventional 945 | C3 PLX 976 | C31 ANOX 70 in 976 | C32 Lowinox AH25 in 976 | C33 Lowinox TBM6 in 976 | C34 Lowinox MD24 in 976 |
| --- | --- | --- | --- | --- | --- | --- |
| Unexposed |  |  |  |  |  |  |
| b 3 Hours | −1.53 | −1.27 | −1.32 | −1.04 | −1.10 | −1.23 |
| b 7 Hours | 10.60 | 5.37 | 5.47 | 7.11 | 6.03 | 7.48 |
| b | 13.57 | 9.25 | 9.70 | 11.35 | 9.91 | 12.29 |

Table VIII shows similarities among several of the experimental blends (C3, C31, C33). The next group found to be significantly more yellowed (C32, C34). Both sets outperformed the control composition, conventional 945 (Amine/Phenol blend).

TABLE XIII

ATMOSPHERIC FUME CHAMBER

|  | C2 Conventional 945 | C3 PLX 976 | C31 ANOX 70 in 976 | C32 Lowinox AH25 in 976 | C33 Lowinox TBM6 in 976 | C34 Lowinox MD24 in 976 |
| --- | --- | --- | --- | --- | --- | --- |
| Unexposed |  |  |  |  |  |  |
| b 3½ Hours | −1.62 | −1.60 | −1.57 | −1.24 | −1.19 | −1.52 |
| b 5 Hours | 12.78 | 7.78 | 9.69 | 7.36 | 8.96 | 8.99 |
| b 11 Hours | 14.79 | 8.80 | 11.49 | 8.00 | 9.80 | 10.00 |
| b | 18.43 | 11.09 | 14.78 | 10.16 | 11.78 | 12.45 |

Table XIII shows the results of foam samples to 11 hours exposure in the atmospheric fume chamber. In all cases the new formulations outperformed the conventional blend significantly.

In summary, it has been shown that tert-butyl catechol (TBC) can be an effective scorch inhibitor. However, liquids are preferred in the industry because of ease of handling. Accordingly, several commercially available liquid phenolics (Isonox 132, Isonox 232 and Irganox 1135) are shown to be effective diluents for TBC, with Isonox 132 imparting the least color to foam according to stress tests, and therefore being the most preferred. Other effective phenolics, though solids and therefore not diluents of TBC, include Lowinox AH25, Lowinox TBM6, Lowinox MD24, and Anox 70 (available from Great Lakes Chemical Corporation). Thus, the combination of a derivatized phenolic and TBC, with or without PTZ, is shown to be a far superior additive than one based on BHT. It is clear that by substituting at the 4 position or 2 position of the phenol with a moiety other than methyl, surprisingly improved results are achieved. Specifically, the invention encompasses a 2,6-tert-butyl phenol, substituted at the 4 position with an aromatic, aliphatic or aromatic-aliphatic moiety of $C_2$ or greater, optionally possessing combinations of heteroatoms, preferably N, O, S or P. Optionally, those phenolics possessing combinations of heteroatoms may be dimerized. PTZ improves scorch performance of the binary blend (TBC/Isonox 132) while not contributing to color deflection. All scorch inhibitors in this study contribute to color when compared to unstabilized foam, but all scorch inhibitors reduce scorch while the unstabilized foam scorched significantly.

The phenolic part of the formulation can be a blended composite of phenolic derivatives (ie. Isonox 132 and Isonox 232 or Isonox 132 and Anox 70, etc). Ranges may be appropriately adjusted to achieve solution stability.

With respect to TBC in the claimed composition, it is recommended that it be present in the preferred range of about 25 to 35%, as there is little difference in scorch within this range. Above 35%, the TBC begins to crystallize out, though it may be dissolved again by heating. Below 25%, it is believed that the composition will not be effective.

Quantitative Treatment of Data

The L,a,b values, from the Hunter L,a,b scale, measured using a Technidyne Corp. Brightimeter Micro S4-M, quantifies color developed in a sample. The L,a,b scale, assigns to each variable (lightness (L), a, b) a corresponding dimension (x, y, z) and creates a color space. L,a,b readings taken from a specimen, represent color deviation from a white plaque standard. In practice, L,a,b readings are first acquired from a control then compared to L,a,b readings taken from a subject specimen. For our purposes, "b"values are compared against control values to quantitatively assess the "yellowness" of a subject specimen. However, though "b" values are convenient for our purposes a more full description of "color drift" is delta E:

(L.a.b.), represents values taken from an arbitrary standard or control, while $(L.a.b.)_2$ represents values specific to a selected specimen. The composite value $\Delta E$, quantitatively expresses color drift away from the control. (One might also recognize that $\Delta E$ is the distance formula for 3-space. Thus the distance of any two points in 3-space is measured using this formula.) Importantly, the $\Delta E$ value is merely an absolute distance from the control. In and of itself it does not say whether the difference is "good" or "bad." If the control had an undesirable color a large $\Delta E$ is desirable because large values indicate a difference between the control and specimen. A small $\Delta E$ would suggest that the specimen resembles the control, which in this case is undesirable. Conversely, if the control exhibits a desirable appearance a small $\Delta E$ is desirable. We found that $\Delta E$ calculations were equivalent in value to simple "b" values from the L.a.b. scale and chose to use the later in our evaluations. Also, the "b" value is fairly descriptive in that we can quickly assess the "yellowness" of a given sample recognizing that yellowness increases as b increases.

Qualitative Assessment of Scorch

Every formulation presented in this patent was subjected to a microwave scorch test. The resultant foam bun was allowed to cool after reaction and split open for visual inspection. We compared each formulation to a control (containing a conventional scorch inhibitor) run the same day. Since every formulation presented in this study performed similarly in scorch to conventional scorch inhibitor packages, we will only incidentally mention those results and rather focus on foam stress tests including NOx treatment, U.V. and fluorescent light exposure. It is our position that the uniqueness of the inventive formulation described below arises from its low staining properties while providing scorch protection equal to commercially available conventional packages.

What is claimed is:

1. A scorch inhibitor composition for use an additive in the manufacture of polyurethane foams, comprising:
   a derivatized di-tert-butyl phenol, substituted with an aromatic, aliphatic or aromatic-aliphatic moiety of $C_2$ or greater, the moiety optionally possessing combinations of heteroatoms, which optionally may be dimerized,
   4-tertbutyl catechol, and
   optionally, phenothiazine.

2. The composition of claims 1, wherein the heteroatoms are one or more chosen from the group consisting of N, O, S and P.

3. The composition of claim 1, wherein the phenol is chosen from the group consisting of 2,2'-thiodiethylene bis[3-(3,5-di-t-butyl-4-hydroxyphenyl) propionate; 4,4'-thio-bis-(2-t-butyl-5-methyl-phenol; and 1,2-bis(3,5-di-tert-butyl-4-hydroxyhydrocinnamoyl) hydrazine.

4. The composition of claim 1, wherein the phenol is 2,5-di-t-amyl-hydroquinone.

5. The composition of claim 1, wherein the phenol is a 2,6-di-tert-butyl phenol derivative or a 2,4-di-tert-butyl phenol derivative.

6. The composition of claim 5, wherein the phenol is 2,6 di-tert-butyl-4-isobutyl phenol.

7. The composition of claim 5, wherein the phenol is 2,6 di-tert-butyl-4-nonyl phenol.

8. The composition of claim 5, wherein the phenol is a liquid phenol.

9. The composition of claim 8, wherein the phenol is chosen from the group consisting of 2,6 di-tert-butyl-4-isobutyl phenol; 2,6 di-tert-butyl-4-nonyl phenol; and benzenepropanoic acid, 3,5-bis (1,1-dimethyl-ethyl)-4-hydroxy-.C7–C9 branched alkyl esters.

10. The composition of claim 9, comprising the following in weight percent:
    derivatized phenol at 45–95%
    tert-butyl-catechol at 5–55%
    phenothiazine at 0–2%.

11. The composition of claim 10, comprising the following in weight percent:
    derivatized phenol at 65–75%
    tert-butyl-catechol at 22–35%
    phenothiazine at 0–0.75%.

12. The composition of claim 11, comprising the following in weight percent:
    derivatized phenol at about 66.5%
    tert-butyl-catechol at about 33%
    phenothiazine at about 0.5%.

13. The composition of claim 5, comprising the following in weight percent:
    derivatized phenol at 45–95%
    tert-butyl-catechol at 5–55%
    phenothiazine at 0–2%.

14. The composition of claim 13, comprising the following in weight percent:
    derivatized phenol at 65–75%
    tert-butyl-catechol at 22–35%
    phenothiazine at 0–0.75%.

15. The composition of claim 14, comprising the following in weight percent:
    derivatized phenol at about 66.5%
    tert-butyl-catechol at about 33%
    phenothiazine at about 0.5%.

16. A polyurethane foam, comprising a scorch inhibitor composition according to any of claims 1–15.

* * * * *